United States Patent Office 3,594,276
Patented July 20, 1971

3,594,276
LEUKOCYTE SEPARATION METHOD
Lester P. Shepherd, Los Angeles, Calif., assignor to Baxter Laboratories, Inc., Morton Grove, Ill.
No Drawing. Filed Apr. 10, 1969, Ser. No. 815,234
Int. Cl. A61k 27/00
U.S. Cl. 195—1.8
2 Claims

ABSTRACT OF THE DISCLOSURE

A method of separating leukocytes from whole blood without agglutination of the erythrocytes consisting of mixing defibrinated whole blood with a liquid extract of the seeds of the Fenugreek herb.

---

This invention relates to a method of separating leukocytes from whole blood and to a method of prolonging the viability of the separated lymphocytes.

The fractionation of blood and the preservation of the separated components for therapeutic and other medical uses is an established practice, particularly since the time of Cohn and his associates at the Harvard University Medical School. It has been found that the erythrocytes, leukocytes and platelets remain viable for longer periods of time if they are separated from plasma and from each other, and that the isolated plasma proteins are very stable when treated separately.

Of all the components of blood, the leukocytes are the most active metabolically. The metabolic activity is so great that they do not normally survive more than a few hours after removal from the body. Moreover, the leukocytes are easily injured by excessive mechanical trauma or laboratory handling. Consequently, the separation and preservation of leukocytes has presented a difficult problem over the years.

Most of the methods for isolating leukocytes from erythrocytes and platelets utilize differences in density of these cellular or formed elements of blood. Other methods involve purification of the leukocytes by destruction of the other formed elements. Several recently developed procedures employ the principles of sedimentation and centrifugation. In the latter procedures, some of the conventional plasma volume expanders, for example, dextran and polyvinylpyrrolidone, have proved to be excellent sedimenting agents.

Once the leukocytes have been isolated from the other formed elements of the blood, they must be treated by one means or another to maintain or prolong their viability if they are to be stored and made available for medical research and other uses. Various nutrient tissue culture media have been devised for this purpose. Another means of preserving the separated leukocytes involves the use of a gelatin-containing medium which, on chilling, forms a gel which keeps the individual cells separated from one another.

The development and use of the above and various other procedures for the separation and preservation of leukocytes is further described by Tullis, Blood, vol. 7, pp. 891–6 (1952) and vol. 8, pp. 563–75 (1953), which are incorporated herein by reference for background information.

A convenient and adequate method for the separation and preservation of leukocytes would be of great use in various fields of medical, medico-legal and anthropological research. In particular, the prolonged in vitro viability of human peripheral lymphocytes would find much use in tissue typing for organ transplantation.

Accordingly, it is an object of the present invention to provide a new and improved method of separating leukocytes for whole blood and for prolonging the viability of the separated lymphocytes for their use in tissue typing procedures and other medical research activities.

It has now been found that the liquid extract of the seeds of the herb *Trigonella foenum graecum* is capable of separating leukocytes from whole blood without agglutination of the erythrocytes and provides a useful base medium for prolonging the viability of the separated lymphocytes during storage.

*Trigonella foenum graecum*, or Fenugreek, is an old world leguminous herb of the family Papilionaceae, tribe Trifolieae, genus Trigonella. See, for example, Hutchinson, "The Genera Of Flowering Plants," vol. 1, p. 456 (1964), published by Oxford University Press. This herb has been used heretofore as both a food and a medicine.

It has long been known that certain plants possess hemagglutinins for specific blood types which provide them with potential use as blood typing reagents. Literally thousands of plants throughout the world have been investigated for their hemagglutinating properties. The substances tested have generally consisted of the aqueous or saline extracts of the ground seeds of these plants. See, for example, Schertz et al., Economic Botony, vol. 14, pp. 232–40 (1690), who describe the hemagglutinating activity of certain Trifolieae seed extracts; Boyd, J. Immunol., vol. 62, pp. 338–9 (1949) and Krüpe, Biol. Zbl., vol. 72, pp. 424–31 (1953), who report in particular that the saline extracts of *Trigonella foenum graecum* are devoid of hemagglutinating activity for human blood cells. However, it has not been known heretofore that extracts of the seeds of the latter plant species could be used as a separating agent for leukocytes and as a useful base media for prolonging the viability of the separated lymphocytes during storage as herein described.

In accordance with the present invention, the dried seeds of the Fenugreek are reduced to a small, particulate form such as, for example, by mechanical attrition by comminution, grinding or pulverizing. The Fenugreek seed particles are then extracted with an aqueous liquid or an organic solvent such as a lower ketone, for example, acetone and methylethylketone, or a lower aliphatic alcohol, for example, methanol, ethanol and isopropanol. Normal physiological saline is the preferred extracting liquid since most serological reactions are carried out in that medium. Crude extracts or more purified concentrates obtained from the liquid extracts such as by additional salt and solvent fractionation methods can be used.

Solubilization of the active principle from the seeds of the Fenugreek in the aqueous liquid or organic solvent is facilitated by treatment at low temperatures, such as from about 0° to about 10° C., during the extraction.

The extraction is conducted for at least about one hour and preferably for about 24 hours or more. The liquid extract containing the active principle can be separated from the residue by centrifugation, filtration and the like separation methods.

Suitable extracts are obtained by comminuting the dried seeds of the Fenugreek to a small particle size, for example, from about one to about 100 microns, such as with a Waring Blendor or an electric coffee grinder and the like equipment and extracting with from about 2 to about 20 parts by weight of normal saline (0.9% NaCl) and adjusting the pH of the resultant extract to about 6.5–7.2.

The herein defined liquid extract of the seeds of the Fenugreek provides a suitable base media for the storage of lymphocytes which have been separated from blood. Under conventional storage in vitro, such as in nutrient tissue medium alone, 95% lymphocytes normally survive for a period of only about 24 to 48 hours. When admixed in the liquid extract of this invention together with a suitable nutrient tissue medium, it has been found that the separated lymphocytes remain viable and unchanged for up to 14 days at room temperature (about 25° C.).

As a separating agent for leukocytes, the herein defined liquid extract of the seeds of Fenugreek is added to defibrinated whole blood and mixed thoroughly. It has been found that the erythrocytes sediment by this procedure without agglutination and that a lymphocyte-rich concentrate is retained together with the seed extract in the leucocyte-rich supernatant.

In a preferred separating procedure of this invention, whole blood is drawn into a sterile, evacuated bottle and defibrinated by gentle agitation or swirling with small glass beads or other inert particulate material until a fibrin clot is formed. A suitable amount of the liquid extract of the seeds of Fenugreek, for example, from about 0.1 to about 2 parts by volume of extract per one part by volume of defibrinated whole blood, is added and mixed thoroughly. The erythrocytes are permitted to sediment and a leukocyte-rich plasma supernatant is removed by a plasma aspirating set containing a suitable filter to remove granulocytes. Subsequently, the lymphocytes, which remain in the Fenugreek base medium, are collected in a sterile, evacuated bottle containing a suitable nutrient tissue culture media.

Using the above procedure, it has been found that about 40% by volume of the liquid extract of the seeds of the Fenugreek added to defibrinated whole blood produces a rapid sedimenting of the erythrocytes within about 15 to about 45 minutes. The resultant supernatant contains about 50% to 85% lymphocytes, thus indicating that the active principle in the liquid extract sediments granulocytes as well as erythrocytes. By using a suitable filter, about 95% to 98% of the remaining granulocytes are removed from the leukocyte-rich plasma supernatant.

For removing the remaining granulocytes from the lymphocytes, a suitable filter such as, for example, siliconized glass wool, glass beads, cotton fibers, or synthetic plastic fibers, for example, "Orlon," "Dacron," "Teflon" and "nylon" fibers can be used. Preferably, a "nylon" polyamide fiber scoured or scrubbed with detergent is used. This scouring removes the finish which is present on commercially-available "nylon" staple. The use of such a scoured "nylon" filter for separating lymphocytes from granulocytes is further described by Greenwalt et al., Transfusion, vol. 2, pp. 221–9 (1962), which is incorporated herein by reference.

Various suitable nutrient tissue culture media can be employed in the practice of this invention together with the base medium of the liquid extract of the Fenugreek seeds for preservation of the separated lymphocytes. Examples of suitable nutrient tissue culture media are the balanced salt solutions of Hanks, Proc. Soc'y. Exper. Biol. Med., vol. 71, pp. 196–200 (1949) and Earle, J. Nat. Cancer Inst., vol. 4, pp. 165–212 (1943); the basal media of Eagle, Science, vol. 122, pp. 501–504 (1955) and J. Biol. Chem., vol. 214, pp. 839–52 (1955); the synthetic media of Puck, J. Exptl. Med., vol. 108, pp. 945–55 (1958) and vol. 109, pp. 649–60 (1959); and the vitamin solutions of Eagles, J. Biol. Chem., vol. 226, pp. 191–206 (1957); all of which are incorporated herein by reference.

The nutrient tissue culture media used herein preferably contain a mixture of balanced salt solutions, buffering salts, essential amino acids and nucleotides or other proteinaceous substances, vitamins or coenzymes, and monosaccharide sugars. Blood serum or a protein fraction thereof can also be used in the nutrient tissue culture medium. Certain enzymes, for example, desoxyribonuclease, are useful in the medium for preventing the formation of leukocyte "clots." Small amounts of antibiotics, for example, penicillin, streptomycin, mycostatin and the like substances can be added to the medium for their preservative effects. A small amount of phenol red or other pH indicator also can be added to serve as a visible check on pH.

Other examples of suitable nutrient tissue culture media containing mixtures of a variety of components are described in U.S. Pat. 3,122,476, Example I, parts A and B, in U.S. Pat. 3,128,228, at col. 4 to 6, and in U.S. Pat. 3,039,923, at col. 2, under the heading "Culture Medium," all of which are incorporated herein by reference.

Various types of blood handling equipment can be used in the practice of the invention described herein. The equipment will generally comprise a defibrination container, for example, a 50 ml., evacuated, sterile bottle containing glass beads, a transfer container, which can be a 125 ml., evacuated, sterile bottle containing a suitable nutrient tissue culture medium, a plasma aspirating set and a blood collector set.

An example of a plasma aspirating set which can be used in the practice of this invention is described in U.S. Pat. 2,934,069; illustrative examples of blood collection sets which can be used in the practice of this invention are described in U.S. Pats. 2,702,034, 3,004,536, 3,127,892, 3,187,750, Re. 25,129 and Re. 25,171.

It will be understood that the invention is not limited to the use of any particular equipment or apparatus, it being intended that the foregoing blood handling equipment is described for illustrative purposes only.

The following examples will further illustrate the invention although the invention is not limited to these specific examples. All parts and percentages herein are by weight unless otherwise specified.

EXAMPLE 1

Dried seeds of *Trigonella foenum graecum* are twice ground with a coffee grinder at a very fine setting and suspended in normal saline (0.9%; 50–55 grams per liter). This mixture is refrigerated at 5° C. with constant agitation for 24 hours. The mixture is then centrifuged at high speed for 30 minutes and the supernatant decanted. The supernatant is diluted with an equal volume of normal saline. Both the concentrated and diluted supernatant can be used for the separating of leukocytes from whole blood without agglutination of the erythrocytes and can be used as base media that prolongs the viability of the separated lymphocytes during storage.

EXAMPLE 2

One gram of the dried seeds of Fenugreek are finely ground in an electric coffee grinder and extracted at room temperature for 2 hours with 10 ml. of physiological saline containing 0.1% sodium azide. After overnight refrigreation, the resulting extract is centrifuged and filtered through glass wool. Centrifugation and filtration are repeated until the supernatant is clear. The clear supernatant is suitable for separation of leukocytes from whole blood and as a base medium for the extended storage of lymphocytes in a vibale and unchanged condition.

EXAMPLE 3

Using a sterile blood collector set, 25 ml. of venous blood is drawn directly into a sterile, evacuated, 50 ml. bottle and immediately defibrinated by gentle agitation with small (5 mm. diameter) glass beads in the bottle for about 5 to 10 minutes. With a sterile syringe, 25 ml. of the diluted supernatant product of Example 1 is added to the bottle and mixed thoroughly. The erythrocytes are then sedimented by permitting the bottle to stand undisturbed at room temperature for about 30 to 40 minutes. The leukocyte-rich supernatant is removed by a plasma aspirating set containing a scoured "nylon" filter. The aspirating needle of the aspirating set is inserted through the stopper on the defibrinated blood bottle and the stopper needle is inserted through the stopper of a sterile, evacuated, 125 ml. transfer bottle containing 25 ml. of a nutrient tissue medium set forth below. A roller clamp, such as described in U.S. Pat. 3,099,429, is opened and aspiration of the plasma is begun. The flow is regulated to about 1 drop every 4 to 5 seconds. As the supernatant passes through the filter, the scoured "nylon" fibers remove substantially all of the remaining granulocytes. Subsequently, the lymphocytes, which remain in the Fenugreek base medium, are collected in the transfer bottle containing the nutrient tissue medium. The stored lymphocytes remain viable and unchanged in this media after 14 days at room temperature (about 25° C.). They can be readily shipped by mail. In tissue typing studies using these stored lymphocytes after a storage period of 14 days, 100% correlation with lymphocytotoxic test results previously obtained with fresh cells is obtained. These stored cells are also useful for karyotyping in chromosome analysis, organ transplant selection an cytogenic studies.

Substantially similar separation and preservation results are obtained when the concentrated supernatant product of Example 1 is substituted for the diluted supernatant product of Example 1 in carrying out the procedure of Example 3.

Composition of nutrient tissue medium admixed with the filtered supernatant of Example 3:

A-salts: Moles/liter
- NaCl — $1.53 \times 10^{-1}$
- KCl — $5.36 \times 10^{-3}$
- $MgSO_4 \cdot 7H_2O$ — $8.10 \times 10^{-5}$
- $Na_2HPO_4 \cdot 7H_2O$ — $4.70 \times 10^{-4}$
- $KH_2PO_4$ — $4.70 \times 10^{-5}$
- $NaHCO_3$ — $1.23 \times 10^{-2}$
- Dextrose — $2.22 \times 10^{-2}$
- $NaC_2H_3O_2 \cdot 3H_2O$ — $7.30 \times 10^{-5}$
- $Fe(NO_3)_3 \cdot 9H_2O$ — $4.30 \times 10^{-6}$ B-amino acids:
- dl-Alpha alanine — $4.30 \times 10^{-4}$
- l-arginine — $6.00 \times 10^{-4}$
- Asparagine — $1.10 \times 10^{-4}$
- l-aspartic acid — $3.40 \times 10^{-4}$
- l-cystine·HCl — $1.30 \times 10^{-4}$
- l-glutamic acid — $7.50 \times 10^{-3}$
- l-glutamine — $2.05 \times 10^{-3}$
- Glycine — $1.00 \times 10^{-3}$
- l-histidine — $1.90 \times 10^{-4}$
- Hydroxy-proline — $1.10 \times 10^{-4}$
- l-isoleucine — $2.20 \times 10^{-4}$
- l-leucine — $6.60 \times 10^{-4}$
- l-lysine·HCl — $5.70 \times 10^{-4}$
- l-methionine — $1.60 \times 10^{-4}$
- l-phenylalanine — $2.30 \times 10^{-4}$
- l-proline — $2.50 \times 10^{-4}$
- l-serine — $4.80 \times 10^{-4}$
- l-threonine — $3.80 \times 10^{-4}$
- l-tryptophan — $7.30 \times 10^{-4}$
- l-tyrosine — $3.30 \times 10^{-4}$
- l-valine — $3.30 \times 10^{-4}$ C-vitamins:
- Ascorbic acid — $2.80 \times 10^{-4}$
- α-Tocopherol phosphate — $4.60 \times 10^{-7}$
- Biotin — $8.10 \times 10^{-7}$
- Calciferol — $5.00 \times 10^{-7}$
- Calcium pantothenate — $2.10 \times 10^{-6}$
- Choline chloride — $8.30 \times 10^{-5}$
- Folinic acid — $2.11 \times 10^{-6}$
- Meso-inositol — $4.70 \times 10^{-5}$
- Menadione — $1.10 \times 10^{-6}$ C-vitamins:
- Nicotinamide — $4.10 \times 10^{-6}$
- Nicotinic acid — $4.00 \times 10^{-6}$
- Pyridoxal hydrochloride — $2.40 \times 10^{-6}$
- Pyridoxine hydrochloride — $2.40 \times 10^{-6}$
- p-Aminobenzoic acid — $7.20 \times 10^{-6}$
- Riboflavin — $5.30 \times 10^{-7}$
- dl-Thioctic acid — $9.70 \times 10^{-6}$
- Thiamine hydrochloride — $5.90 \times 10^{-7}$
- Vitamin A — $6.10 \times 10^{-6}$ D-nucleotides and other substances:
- Adenine hydrochloride — $5.50 \times 10^{-5}$
- Adenylic acid — $5.40 \times 10^{-6}$
- d-Ribose — $9.30 \times 10^{-5}$
- Glutathione — $3.30 \times 10^{-6}$
- Guanine·hydrochloride — $3.30 \times 10^{-5}$
- Hypoxanthine — $3.70 \times 10^{-5}$
- Thymidine — $2.10 \times 10^{-5}$
- Uracil — $4.50 \times 10^{-5}$
- Xanthine — $3.2 \times 10^{-5}$
- Sodium adenosinetriphosphate — $5.4 \times 10^{-5}$
- Sodium pyruvate — $1.00 \times 10^{-3}$
- Heparin, 1000 units/liter [1]
- Phytohemagglutinin P [2], 0.25/ml./liter [1].
- Pencillin potassium G, 100,000 units/liter [1].
- Dihydrostreptomycin sulfate, 150,000 μg./liter [1].

[1] Ingredients added after the medium and cell suspension are prepared.
[2] Burroughs Wellcome & Co., lyophilized product reconstituted to original volume.

Various other examples can be devised by the person skilled in the art after reading the invention described herein without departing from the spirit and scope of the invention. All such further examples are included within the scope of the invention as defined in the appended claims.

What is claimed is:

1. The method of separating leukocytes from whole blood without agglutination of the erythrocytes comprising treating one volume of defibrinated whole blood with from about 0.1 to about 2 volumes of a liquid extract of the seeds of *Trigonella foenum graecum* which extract is prepared by extracting one part by weight of the seeds with from about 2 to about 20 parts by weight of material selectd from the group consisting of aqueous salt solution, lower ketones and lower aliphatic alcohols and which treatment comprises thoroughly mixing together the extract and the blood, allowing sedimentation to occur, and thereafter recovering the thus-produced leukocyte-rich supernatant.

2. The method which comprises treating one volume of defibrinated whole blood with from about 0.1 to about 2 volumes of a liquid extract of the seeds of *Trigonella foenum graecum* which extract is prepared by extracting one part by weight of the seeds with from about 2 to about 20 parts by weight of normal physiological saline and which treatment comprises thoroughly mixing together the extract and the blood, allowing sedimentation to occur, and thereafter recovering the thus-produced leukocyterich supernatant.

No references cited.

RICHARD L. HUFF, Primary Examiner